US008110283B2

(12) United States Patent
Bansal et al.

(10) Patent No.: US 8,110,283 B2
(45) **Date of Patent: *Feb. 7, 2012**

(54) ARTICLE AND ASSOCIATED METHOD

(75) Inventors: Vishal Bansal, Overland Park, KS (US); Benjamin Hale Winkler, Albany, NY (US); Hieu Minh Duong, Rosemead, CA (US); Tamaki Ryo, Valencia, CA (US)

(73) Assignee: General Electric Company, Niskayuna, NY (US)

(*) Notice: Subject to any disclaimer, the term of this patent is extended or adjusted under 35 U.S.C. 154(b) by 822 days.

This patent is subject to a terminal disclaimer.

(21) Appl. No.: 11/863,400

(22) Filed: Sep. 28, 2007

(65) Prior Publication Data

US 2009/0155564 A1 Jun. 18, 2009

(51) Int. Cl.
*B32B 3/26* (2006.01)

(52) U.S. Cl. ... 428/305.5; 2/457; 428/312.2; 428/312.8; 442/59; 442/76; 442/77; 442/88; 442/121; 442/172; 442/180; 442/348

(58) Field of Classification Search .................... 442/59, 442/172, 180, 348, 76, 77, 88, 121; 428/305.5, 428/312.2, 312.8; 2/457
See application file for complete search history.

(56) References Cited

U.S. PATENT DOCUMENTS

| | | | | |
|---|---|---|---|---|
| 4,427,576 | A | 1/1984 | Dupin | |
| 5,814,405 | A * | 9/1998 | Branca et al. | 428/311.51 |
| 7,445,799 | B1 * | 11/2008 | Sarangapani et al. | 424/618 |
| 2002/0098341 | A1 * | 7/2002 | Schiffer et al. | 428/323 |
| 2004/0259446 | A1 * | 12/2004 | Jain et al. | 442/59 |
| 2005/0164092 | A1 | 7/2005 | Alberti et al. | |
| 2005/0169820 | A1 | 8/2005 | Tatarchuk et al. | |
| 2005/0191918 | A1 * | 9/2005 | Langley et al. | 442/59 |
| 2005/0266228 | A1 * | 12/2005 | Jain et al. | 428/316.6 |
| 2007/0017861 | A1 | 1/2007 | Foley et al. | |

FOREIGN PATENT DOCUMENTS

| | | | |
|---|---|---|---|
| WO | WO9940996 | A1 | 8/1999 |
| WO | WO2005105667 | A1 | 11/2005 |

OTHER PUBLICATIONS

PCT International Search Report dated.
PCT International Search Report dated Aug. 29, 2008.

* cited by examiner

*Primary Examiner* — Peter Y Choi
(74) *Attorney, Agent, or Firm* — Paul J. DiConza

(57) ABSTRACT

An article includes a membrane having pores and that is air permeable. A nanoparticle precursor is dispersed throughout the pores, and the nanoparticle precursor is responsive to a stimulus to form a catalytically active nanoparticle. An associated method is also provided.

34 Claims, 10 Drawing Sheets

ARTICLE AND ASSOCIATED METHOD

STATEMENT REGARDING FEDERALLY SPONSORED RESEARCH & DEVELOPMENT

This invention was made with Government support under contract number BAA 05-07 awarded by NATICK under W911-QY-05-C-0102. The Government has certain rights in the invention.

BACKGROUND

1. Technical Field

The invention includes embodiments relating to catalytically active membrane. The invention includes embodiments that relate to a method of making and using the catalytically active membrane.

2. Discussion of Related Art

Membranes with high porosity, chemical resistance, and having catalytically active particles are useful in high performance applications, for example, catalytically-active filters and chemical-biological protective apparels. Protective apparels designed for use against chemical and biological agents require good comfort properties in addition to the protective properties.

Expanded PTFE (ePTFE) is desirable for chemical and temperature resistance, and high air flow for a given pore size. However, due to the hydrophobic property of the ePTFE membrane, it may be difficult to incorporate aqueous dispersions of catalytically active particles homogeneously into the porous membrane by techniques such as dip-coating, slot-die coating, etc. Non-homogeneous dispersion of the particles in the pores or on the surface of the membranes lead to pore occlusion resulting in reduced air permeability.

It may be desirable to have a catalytically active membrane with properties that differ from those properties of currently available membranes. It may be desirable to have a catalytically active membrane produced by a method that differs from those methods currently available.

BRIEF DESCRIPTION

In one embodiment, an article is provided. An article includes a membrane having pores and that is air permeable. A nanoparticle precursor is dispersed throughout the pores, and the nanoparticle precursor is responsive to a stimulus to form a catalytically active nanoparticle.

In one embodiment, an article includes a membrane having pores and that is air permeable. A plurality of nanoparticles is dispersed throughout the pores, and the nanoparticles are catalytically active.

In one embodiment, a method is provided. The method includes exposing a chembio agent to a membrane having pores and having a plurality of catalytically active nanoparticles dispersed throughout the pores. The method further includes infiltrating the chembio agent into the pores and reacting the chembio agent with the nanoparticles within the pores.

BRIEF DESCRIPTION OF DRAWING FIGURES

DETAILED DESCRIPTION

Figure 1:
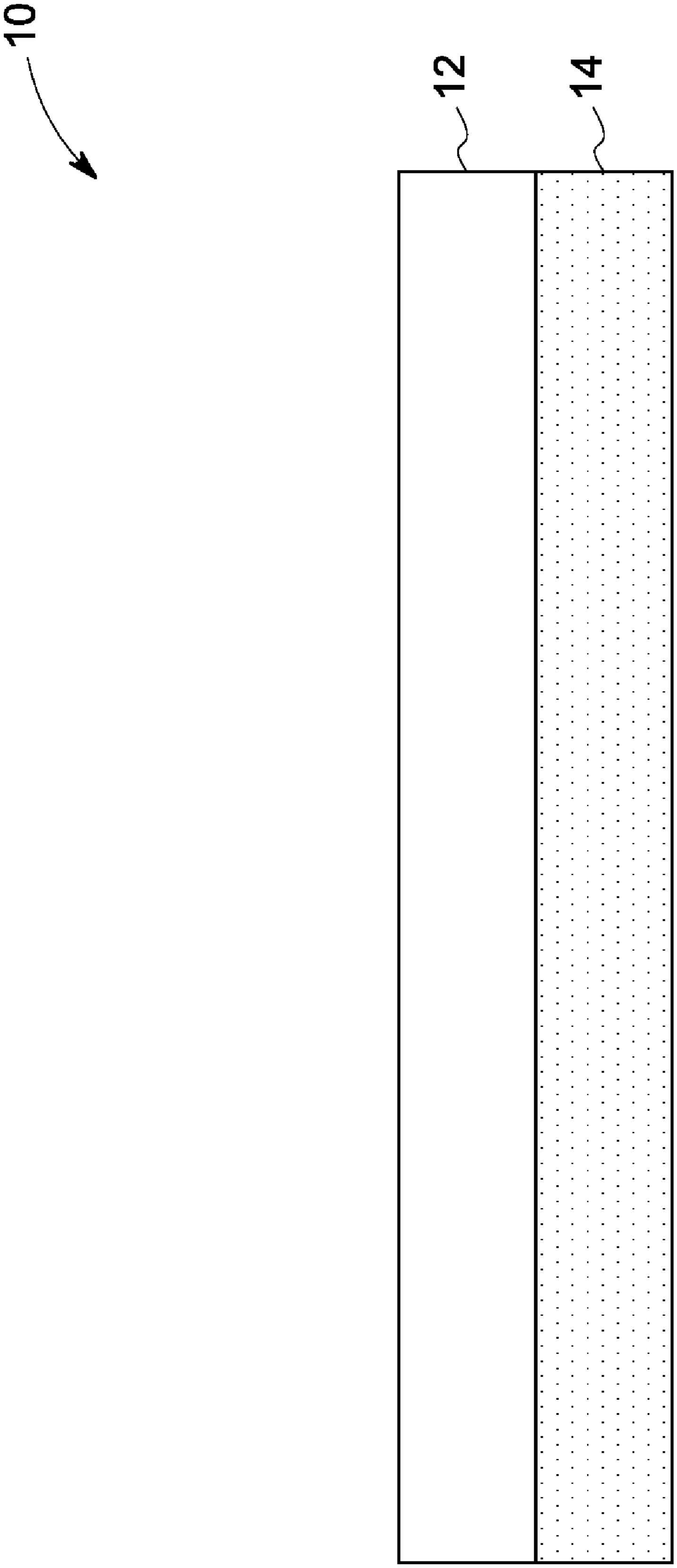
FIG. 1 shows a cross-section of an article in accordance with one embodiment of the invention.

The invention includes embodiments that relate to a catalytically active article. The invention includes embodiments that relate to methods of making and using the catalytically active article.

In the following specification and the clauses which follow, reference will be made to a number of terms have the following meanings. The singular forms "a", "an" and "the" include plural referents unless the context clearly dictates otherwise. Approximating language, as used herein throughout the specification and clauses, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be".

In one embodiment, an article is provided. The article includes a membrane having pores and that is air permeable. A nanoparticle precursor is dispersed throughout the pores, and the nanoparticle precursor is responsive to a stimulus to form a catalytically active nanoparticle. As used herein the term "air permeable" means that the membrane has contiguous air pathways from one side of the membrane to the other side of the membrane. As used herein, an air permeable membrane has an air permeability that is greater than about 0.01 $cfm/ft^2$ at 0.5 inches $H_2O$ measured using the ASTM D737 method.

In one embodiment, the membrane may include a fluorinated polymer. As used herein, the term "fluorinated polymer" refers to a polymer in which some or all of the hydrogen atoms are replaced by fluorine. In one embodiment, the membrane may include a fluorinated polyolefin. As used herein, the term "fluorinated polyolefin" refers to a fluorinated polymer derived from one or more fluorinated polymer precursors containing ethylenic unsaturation. A suitable fluorinated polymer precursor may be a partially fluorinated olefin which may include other substituents, e.g. chlorine or hydrogen. A suitable fluorinated polymer precursor may be a straight or branched chain compound having a terminal ethylenic double bond. In one embodiment, a suitable polymer precursor may include one or more of hexafluoropropylene, pentafluoropropylene, tetrafluoroethylene, vinylidine fluoride, or perfluoroalkyl vinyl ethers, for example, perfluoro (methyl vinyl ether) or (propyl vinyl ether).

In one embodiment, a fluorinated polyolefin essentially includes or both of polyvinylidene fluoride or polytetrafluoroethylene. In one embodiment, a fluorinated polyolefin essentially includes expanded polytetrafluoroethylene (ePTFE). Suitable ePTFE membranes may be commercially obtainable from General Electric Energy (Kansas City, Mo.).

In some embodiments, a suitable membrane includes one or more of polyalkene, polyarylene, polyamide, polyester, polysulfone, polyether, polyacrylic, polystyrene, polyurethane, polyarylate, polyimide, polycarbonate, polysiloxane, polyphenylene oxide, cellulosic polymer, or substituted derivatives thereof. In some embodiments, the membrane includes a biocompatible material or a biodegradable material, such as aliphatic polyesters, polypeptides and other naturally occurring polymers.

In one embodiment, the membrane may be made by extruding a mixture of fine powder particles and lubricant. The extrudate subsequently may be calendered. The calendered extrudate may be "expanded" or stretched in one or more directions, to form fibrils connecting nodes to define a three-dimensional matrix or lattice type of structure. "Expanded" means stretched beyond the elastic limit of the material to introduce permanent set or elongation to fibrils. The membrane may be heated or "sintered" to reduce and minimize residual stress in the membrane material by changing portions of the material from a crystalline state to an amorphous state. In one embodiment, the membrane may be unsintered or partially sintered as is appropriate for the contemplated end use of the membrane. In one embodiment, the membrane may define many interconnected pores that fluidly communicate with environments adjacent to the opposite facing major sides of the membrane.

Other materials and methods may be used to form the membrane having an open pore structure. The membrane may be rendered permeable by, for example, one or more of perforating, stretching, expanding, bubbling, precipitating or extracting the base membrane. Suitable methods of making the membrane include foaming, skiving or casting any of the suitable materials. In alternate embodiments, the membrane may be formed from woven or non-woven fibers.

In one embodiment, continuous pores may be produced. Suitable porosity may be in a range of greater than about 10 percent by volume. In one embodiment, the porosity may be in a range of from about 10 percent to about 20 percent, from about 20 percent to about 30 percent, from about 30 percent to about 40 percent, from about 40 percent to about 50 percent, from about 50 percent to about 60 percent, from about 60 percent to about 70 percent, from about 70 percent to about 80 percent, from about 80 percent to about 90 percent, or greater than about 90 percent by volume. Here and throughout the specification and claims, range limitations may be combined and/or interchanged. Such ranges are identified by their range limitations, and include all the sub-ranges contained therein unless context or language indicates otherwise.

Pore diameter may be uniform from pore to pore, and the pores may define a predetermined pattern. Alternatively, the pore diameter may differ from pore to pore, and the pores may define an irregular pattern. Suitable pore diameters may be less than about 500 micrometers. In one embodiment, an average pore diameter may be in a range of from about 1 micrometer to about 10 micrometers, from about 10 micrometers to about 50 micrometers, from about 50 micrometers to about 100 micrometers, from about 100 micrometers to about 250 micrometers, or from about 250 micrometers to about 500 micrometers. In one embodiment, the average pore diameter may be less than about 1 micrometer, in a range of from about 1 nanometer to about 50 nanometers, from about 50 nanometers to about 0.1 micrometers, from about 0.1 micrometers to about 0.5 micrometers, or from about 0.5 micrometers to about 1 micrometer. In one embodiment, the average pore diameter may be less than about 1 nanometer. In one embodiment, the pores may essentially have an average pore diameter in a range of from about 10 nanometers to about 10 micrometers.

Surfaces of nodes and fibrils may define numerous interconnecting pores that extend through the membrane between opposite major side surfaces in a tortuous path. In one embodiment, the average effective pore size of pores in the membrane may be in the micrometer range. In one embodiment, the average effective pore size of pores in the membrane may be in the nanometer range. A suitable average effective pore size for pores in the membrane may be in a range of from about 0.01 micrometers to about 0.1 micrometers, from about 0.1 micrometers to about 5 micrometers, from about 5 micrometers to about 10 micrometers, or greater than about 10 micrometers.

In one embodiment, the membrane may be a three-dimensional matrix or have a lattice type structure including plurality of nodes interconnected by a plurality of fibrils. Surfaces of the nodes and fibrils may define a plurality of pores in the membrane. The size of a fibril may be in a range of from about 0.05 micrometers to about 0.5 micrometers in diameter taken in a direction normal to the longitudinal extent of the fibril. The specific surface area of the membrane may be in a range of from about 9 square meters per gram of membrane material to about 110 square meters per gram of membrane material.

Membranes according to embodiments of the invention may have differing dimensions, some selected with reference to application-specific criteria. In one embodiment, the membrane may have a thickness in the direction of fluid flow in a range of less than about 10 micrometers. In another embodiment, the membrane may have a thickness in the direction of fluid flow in a range of greater than about 10 micrometers, for example, in a range of from about 10 micrometers to about 100 micrometers, from about 100 micrometers to about 1 millimeter, from about 1 millimeter to about 5 millimeters, or greater than about 5 millimeters. In one embodiment, the membrane may have an average thickness in a range of from about 0.0005 inches (12.7 micrometers) to about 0.005 inches (127 micrometers). In one embodiment, the membrane may be formed from a plurality of differing layers.

Perpendicular to the direction of fluid flow, the membrane may have a width of greater than about 10 millimeters. In one embodiment, the membrane may have a width in a range of from about 10 millimeters to about 45 millimeters, from about 45 millimeters to about 50 millimeters, from about 50 millimeters to about 10 centimeters, from about 10 centimeters to about 100 centimeters, from about 100 centimeters to about 500 centimeters, from about 500 centimeters to about 1 meter, or greater than about 1 meter. The width may be a diameter of a circular area, or may be the distance to the nearest peripheral edge of a polygonal area. In one embodiment, the membrane may be rectangular, having a width in the meter range and an indeterminate length. That is, the membrane may be formed into a roll with the length determined by cutting the membrane at predetermined distances during a continuous formation operation.

In one embodiment, the membrane may have a unit average weight in a range of less than about 0.05 oz/yd$^2$. In one embodiment, the membrane may have a unit average weight in a range of from about 0.05 oz/yd$^2$ to about 0.1 oz/yd$^2$, from about 0.1 oz/yd$^2$ to about 0.5 oz/yd$^2$, from about 0.5 oz/yd$^2$ to about 1 oz/yd$^2$, from about 1 oz/yd$^2$ to about 2 oz/yd$^2$, or from about 2 oz/yd$^2$ to about 3 oz/yd$^2$.

A nanoparticle precursor may be dispersed throughout the pores of the membrane. A nanoparticle precursor may refer to a compound capable of being converted to a catalytically active nanoparticle when exposed to a stimulus. In one embodiment, a nanoparticle precursor may include one or more metal and a ligand.

In one embodiment, a metal in the nanoparticle precursor may include one or more silver of (Ag), copper (Cu), zinc (Zn), aluminum (Al), magnesium (Mg), or titanium (Ti).

A suitable ligand may include a molecule or an ion having at least one atom having a lone pair of electrons that may bond to a metal atom or ion. A ligand may also include unsaturated molecules or ions that may bind to a metal atom or ion. Unsaturated molecules or ions may include at least one carbon-carbon double bond formed by the side-by-side overlap of p-atomic orbitals on adjacent atoms. In one embodiment, the ligand may include an alkoxide group or a carbamate group.

A ligand may further include an organic backbone or an inorganic backbone. An organic backbone for the ligand may have only carbon-carbon linkages (for example, olefins) or carbon-heteroatom-carbon linkages (for example, ethers, esters and the like) in the main chain. An inorganic backbone for a ligand may include main chain linkages other than that of carbon-carbon linkages or carbon-heteroatom-carbon linkages, for example, silicon-silicon linkages in silanes, silicon-oxygen-silicon linkages in siloxanes, phosphorous-nitrogen-phosphorous linkages in phosphazenes, and the like.

In one embodiment, a nanoparticle precursor may include one or more of a metal alkoxide, a metal halide, or a metal carbamate. A suitable alkoxide may include a metal ethoxide, a metal isopropoxide, or a metal butoxide. In one embodiment, a nanoparticle precursor may essentially include titanium alkoxide. In one embodiment, a nanoparticle precursor may essentially include silver carbamate.

In one embodiment, a nanoparticle precursor may decompose when exposed to a stimulus to form elemental metal, a metal oxide, or a mixed metal oxide. Elemental metal refers to a substantially pure metal or alloy having an oxidation state of zero. In one embodiment, a nanoparticle precursor may decompose when exposed to a stimulus to form a titanium oxide ($TiO_2$) nanoparticle. In one embodiment, a nanoparticle precursor may decompose when exposed to a stimulus to form a silver nanoparticle.

The amount of nanoparticle precursor in the membrane may vary depend on one or more of: the end-use, relative amount of metal in the entire nanoparticle precursor, amount of nanoparticle required in the final composition, and other factors. In one embodiment, the membrane may include a nanoparticle precursor in an amount that is less than about 0.1 weight percent. In one embodiment, the membrane may include a nanoparticle precursor in an amount in a range of from about 0.1 weight percent to about 1 weight percent, from about 1 weight percent to about 2 weight percent, from about 2 weight percent to about 5 weight percent, from about 5 weight percent to about 10 weight percent of the membrane.

In one embodiment, the membrane may include a nanoparticle precursor in an amount in a range of from about 10 weight percent to about 20 weight percent, from about 20 weight percent to about 30 weight percent, from about 30 weight percent to about 40 weight percent, or from about 40 weight percent to about 50 weight percent of the membrane. In one embodiment, the membrane may include a nanoparticle precursor in an amount that is greater than about 50 weight percent.

A nanoparticle precursor, as described hereinabove may decompose when exposed to a stimulus to form a catalytically active nanoparticle. In one embodiment, the nanoparticle precursor may decompose when exposed to a stimulus selected from the group consisting of electromagnetic radiation, thermal energy, or water. Electromagnetic radiation may include ultraviolet, infrared, visible, electron beam, or microwave radiation. Electromagnetic radiation may include a coherent beam, for example, in a laser.

Thermal energy may include application of heat to the nanoparticle precursor resulting in an increase in temperature of the membrane. In one embodiment, the nanoparticle precursor may decompose by heating the nanoparticle precursor to a temperature in a range of from about room temperature (RT) to about 40 degrees Celsius, from about 40 degrees Celsius to about 60 degrees Celsius, from about 60 degrees Celsius to about 80 degrees Celsius, from about 80 degrees Celsius to about 100 degrees Celsius, from about 100 degrees Celsius to about 120 degrees Celsius, or from about 120 degrees Celsius to about 150 degrees Celsius. In one embodiment, the nanoparticle precursor may decompose by heating the nanoparticle precursor to a temperature in a range of from about 150 degrees Celsius to about 175 degrees Celsius to, from about 175 degrees Celsius to about 200 degrees Celsius, from about 200 degrees Celsius to about 225 degrees Celsius, or from about 225 degrees Celsius to about 250 degrees Celsius. In one embodiment, the nanoparticle precursor may decompose essentially at a temperature in a range of less than about 120 degrees Celsius.

Decomposition by exposure to water may include exposing the nanoparticle precursor in the membrane to a water or water vapor source. In one embodiment, the stimulus may include exposing the nanoparticle precursor to air, wherein the nanoparticle precursor may be hydrolyzed by the moisture in the air to form the catalytically active nanoparticles.

In some embodiments, the stimulus may include a reducing agent. A reducing agent may refer to a compound capable of reducing the metal compound in the nanoparticle precursor to its elemental form or to form a metal oxide. In one embodiment, the reducing agent may be selected from the group consisting of alcohols, aldehydes, amines, amides, alanes, boranes, borohydrides, aluminohydrides, onium salts, and organosilanes. In one embodiment, the reducing agent essentially includes one or more of onium salt, alcohol, amine, amide, borane, borohydride, or organosilane. In one embodiment, the reducing agent essentially includes an onium salt. In one embodiment, the reducing agent essentially includes an iodonium salt. In one embodiment, the stimulus may include application of thermal energy and contact with a reducing agent. In one embodiment, the stimulus may include exposure to water.

The amount of reducing agent may depend on the reaction conditions and on the selected nanoparticle precursor. In one embodiment, the reducing agent may be present in an amount equal to or greater than the minimum stoichiometric amount necessary to convert all of the metal in the nanoparticle precursor to its elemental form or to form a metal oxide at the desired conversion conditions. In one embodiment, an amount of reducing agent employed may be in excess relative to the amount of the nanoparticle precursor.

In one embodiment, an article may include a decomposition product of the nanoparticle precursor. A decomposition product of the nanoparticle precursor may include a catalytically active nanoparticle. "Catalytically active nanoparticles"', as used herein, include particles with active species or particles capable of generating active species in response to a stimulus (for example, UV radiation). The active species may be capable of reacting or interacting with chembio agents or fluid contaminants to reduce their activity, to increase their infiltration time through the membrane, or convert them to a harmless by-product or end-product.

Nanoparticle as used herein refers to particles having an average particle size on the nano scale. A nanoparticle may have a largest dimension (for example, a diameter or length) in the range of from about 1 nanometer to 1000 nanometers. Nanoparticle as used herein, may refer to a single nanoparticle, a plurality of nanoparticles, or a plurality of nanoparticles associated with each other. Associated refers to a metal nanoparticle in contact with at least one other metal nanoparticle. In one embodiment, associated refers to a metal nanoparticle in contact with more than one other particle.

In one embodiment, a decomposition product of the nanoparticle precursor may include a catalytically active metal nanoparticle. In one embodiment, the decomposition reaction may not go to completion, and the membrane may include unreacted nanoparticle precursor in addition to the decomposition product. In one embodiment, the membrane may include unreacted nanoparticle precursor and metal nanoparticle. In one embodiment, the membrane may include unreacted nanoparticle precursor, metal nanoparticle, and a decomposition product of the ligand. For example, in one embodiment, a decomposition product of a metal carbamate nanoparticle precursor may include unreacted nanoparticle precursor, metal nanoparticle, an amine, and carbon dioxide. Similarly, in one embodiment, a decomposition product of a metal alkoxide nanoparticle precursor may include unreacted nanoparticle precursor, metal nanoparticle, and an alkane.

In one embodiment, all the metal in the nanoparticle precursor may not be converted to a catalytically active metal nanoparticle. In one embodiment, greater than about 90 weight percent of the metal in the nanoparticle precursor may be converted to a catalytically active nanoparticle. In one embodiment, a weight percent of the metal in the nanoparticle precursor that may be converted to a catalytically active nanoparticle may be in a range of from about 25 percent to about 40 weight percent, from about 40 weight percent to about 60 weight percent, from about 60 weight percent to about 75 weight percent, or from about 75 weight percent to about 90 weight percent. In one embodiment, greater than about 25 weight percent of the metal in the nanoparticle precursor may be converted to a catalytically active nanoparticle.

In one embodiment, a catalytically active nanoparticle may include titanium dioxide. In one embodiment, a catalytically active nanoparticle may include elemental silver. In one embodiment, a catalytically active nanoparticle may include an oxide of aluminum, silver, copper, or magnesium.

As described herein earlier, a nanoparticle may refer to a single particle or may include a plurality of particles. The plurality of particles may be characterized by one or more of average particle size, particle size distribution, average particle surface area, particle shape, or particle cross-sectional geometry.

The size of the nanoparticle may depend on the pore size of the membrane used and on the activity to size relationship of the active nanoparticle used. In one embodiment, an average particle size of the nanoparticle may be in a range of less than about 1 nanometer. In one embodiment, an average particle size of the nanoparticle may be in a range of from about 1 nanometer to about 10 nanometers, from about 10 nanometers to about 25 nanometers, from about 25 nanometers to about 50 nanometers, from about 50 nanometers to about 75 nanometers, or from about 75 nanometers to about 100 nanometers. In one embodiment, an average particle size of the nanoparticle may be in a range of from about 100 nanometers to about 200 nanometers, from about 200 nanometers to about 300 nanometers, from about 300 nanometers to about 400 nanometers, or from about 400 nanometers to about 500 nanometers. In one embodiment, an average particle size of the nanoparticle may be essentially in a range of from about 5 nanometers to about 500 nanometers.

A plurality of particles may have a distribution of particle sizes that may be characterized by both a number-average size and a weight-average particle size. The number-average particle size may be represented by $S_N=\Sigma(s_i n_i)\Sigma n_i$, where $n_i$ is the number of particles having a particle size $s_i$. The weight average particle size may be represented by $S_W=\Sigma(s_i n_i^2)\Sigma(s_i n_i)$. When all particles have the same size, $S_N$ and $S_W$ may be equal. In one embodiment, there may be a distribution of sizes, and $S_N$ may be different from $S_W$. The ratio of the weight average to the number average may be defined as the polydispersity index ($S_{PDI}$). In one embodiment, $S_{PDI}$ may be equal to about 1. In one embodiment, $S_{PDI}$ may be in a range of from about 1 to about 1.2, from about 1.2 to about 1.4, from about 1.4 to about 1.6, or from about 1.6 to about 2.0. In one embodiment, $S_{PDI}$ may be in a range that is greater than about 2.0.

In one embodiment, the metal nanoparticle may include a plurality of particles having a particle size distribution selected from the group consisting of normal distribution, unimodal distribution, and bimodal distribution. Certain particle size distributions may be useful to provide certain benefits, and other ranges of particle size distributions may be useful to provide other benefits. A normal distribution may refer to a distribution of particle sizes with $S_{PDI}$ equal to 1. A unimodal distribution may refer to a distribution of particle sizes having the same particle size. In another embodiment, nanoparticle particles having two distinct size ranges (a bimodal distribution) may be included in the membrane: the first range from about 1 nanometer to about 10 nanometers, and the second range from about 20 nanometers to about 50 nanometers. In another embodiment, a membrane may essentially include a unimodal distribution of nanoparticle sizes.

A nanoparticle may have a variety of shapes and cross-sectional geometries. In one embodiment, a nanoparticle may have a shape that is a sphere, a rod, a tube, a flake, a fiber, a plate, a wire, a cube, or a whisker. A nanoparticle may include particles having two or more of the aforementioned shapes. In one embodiment, a cross-sectional geometry of the particle may be one or more of circular, ellipsoidal, triangular, rectangular, or polygonal. In one embodiment, a nanoparticle may consist essentially of non-spherical particles. For example, such particles may have the form of ellipsoids, which may have all three principal axes of differing lengths, or may be oblate or prelate ellipsoids of revolution. Non-spherical nanoparticles may alternatively be laminar in form, wherein laminar refers to particles in which the maximum dimension along one axis is substantially less than the maximum dimension along each of the other two axes. Non-spherical nanoparticles may also have the shape of frusta of pyramids or cones, or of elongated rods. In one embodiment, the nanoparticles may be irregular in shape. In one embodiment, the nanoparticle may consist essentially of spherical particles.

A nanoparticle may have a high surface-to-volume ratio. A nanoparticle may be crystalline or amorphous. In one embodiment, a single type (size, shape, and the like) of nanoparticle may be used, or mixtures of different types of nanoparticles may be used. If a mixture of nanoparticles is used they may be homogeneously distributed in the pores of the membrane.

In one embodiment, an article may include a membrane having pores and that is air permeable. A plurality of nanoparticles is dispersed throughout the pores, and the nanoparticles are catalytically active. In one embodiment, the nanoparticles may be dispersed uniformly throughout the pores of the membrane.

In one embodiment, the catalytically active nanoparticle may be present in an effective amount. An effective amount of nanoparticle refers to amount of nanoparticle required to provide the catalytically active species sufficient to meet the performance requirements of the end-use application. In one embodiment, the membrane may include a nanoparticle in an amount that is less than about 0.1 weight percent of the combined weight of the membrane and the nanoparticle. In one embodiment, the membrane may include a nanoparticle in an amount in a range of from about 0.1 weight percent to about 1 weight percent, from about 1 weight percent to about 2 weight percent, from about 2 weight percent to about 5 weight percent, from about 5 weight percent to about 10 weight percent of the combined weight of the membrane and the nanoparticle. In one embodiment, the membrane may include a nanoparticle in an amount in a range of from about 10 weight percent to about 20 weight percent, from about 20 weight percent to about 30 weight percent, from about 30 weight percent to about 40 weight percent, or from about 40 weight percent to about 50 weight percent of the combined weight of the membrane and the nanoparticle. In one embodiment, the membrane may include a metal nanoparticle in an amount that is greater than about 50 weight percent of the combined weight of the membrane and the nanoparticle. In one embodiment, the nanoparticle is present in an amount in a range of from about 0.1 weight percent to about 20 weight percent of the combined weight of the membrane and the nanoparticle.

In one embodiment, a catalytically active nanoparticle may be capable of reacting or interacting with a chembio agent to inactivate the chembio agent. As used herein the term "inactivating a chembio agent" may include one or both of reducing the biological activity of the chembio agent or increasing an amount of time for a significant amount of unreacted biologically active chembio agent to pass through the article. As used herein, the term "chembio agent" includes a chemical agent, a biological agent, or combinations of chemical agent and biological agent. A chemical agent may be a non-living chemical substance having toxic properties. A chemical agent may include nonliving toxic products produced by living organisms e.g., toxins. A biological agent may be a living or a quasi-living material (e.g., prions) having toxic properties.

In one embodiment, a chembio agent may include a chemical warfare agent. Suitable chemical warfare agents may include one or more incapacitating agents, lachrymators, vesicants or blister agents, nerve agents, pulmonary agents, blood agents, or malodorants.

Suitable incapacitating agents may include nervous system affecters, vomiting agents, choking agents, hallucinogens, sedatives, narcotics, depressants, and the like, and combinations of two or more thereof. In one embodiment, an incapacitating agent may include 3-quinuclidinyl benzilate (QNB, BZ), which may be an anticholinergic agent that may react with a probe comprising, for example, choline. Alternative nervous system affecters may include commercially available over the counter (OTC) or prescription pharmaceutical compositions. In one embodiment, an incapacitating agent may include curare, or a curare analog or derivative.

Suitable lachrymators may include one or more of o-chlorobenzylmalonitrile, chloromethyl chloroformate, stannic chloride, sym-dichloromethyl ether, benzyl bromide, xylyl bromide, methyl chlorosulphonate, ethyl iodoacetate, bromacetone, bromomethyl-ethyl ketone, acrolein (2-propanal), capsaicin including analogs and derivatives, or the like.

A suitable vesicant may include one or more of sulfur mustard, nitrogen mustard, or an arsenical such as Lewisite. Suitable sulfur mustard may include one or more of 2-chloroethyl chloromethyl sulfide, bis(2-chloroethyl) sulfide or dichloroethyl disulfide, bis (2-chloroethylthio) methane, 1,2-bis (2-chloroethylthio) ethane, 1,3-bis (2-chloroethylthio)-n-propane, 1,4-bis (2-chloroethylthio)-n-butane, 1,5-bis (2-chloroethylthio)-n-pentane, bis (2-chloroethylthiomethyl) ether, or bis (2-chloroethyl thioethyl) ether. Suitable nitrogen mustard may include one or more of bis (2-chloroethyl) ethylamine, bis (2-chloroethyl) methylamine, or tris (2-chloroethyl) amine. Suitable Lewisites may include one or more of 2-chlorovinyl dichloroarsine, or bis (2-chlorovinyl) chloroarsine, tris (2-chlorovinyl) arsine.

Suitable nerve agents may include cholinesterase inhibitors. In one embodiment, a cholinesterase inhibitor may include one or more of o-alkyl (Me, Et, n-Pr or i-Pr)—phosphonofluoridates, such as o-isopropyl methylphosphonofluoridate (sarin) or o-pinacolyl methylphosphonofluoridate (soman); o-alkyl N,N-dialkyl (Me, Et, n-Pr or i-Pr) phosphoramidocyanidates, such as o-ethyl N,N-dimethyl phosphoramidocyanidate (tabun); or o-alkyl S-2-dialkyl (Me, Et, n-Pr or i-Pr)-aminoethyl alkyl (Me, Et, n-Pr or i-Pr) phosphonothiolates and corresponding alkylated or protonated salts, such as o-ethyl S-2-diisopropylaminoethyl methyl phosphonothiolate.

Suitable pulmonary agents may include one or both of phosgene (carbonyl chloride) and perfluroroisobutylene. Suitable chemical toxins may include one or more of palytoxin, ricin, saxitoxin, or botulinum toxin.

Suitable blood agents may include forms of cyanide such as salts, and analogs and derivatives of cyanide salts. A suitable solid salt of cyanide may include sodium, potassium, and/or calcium. A suitable volatile liquid form of cyanide may include hydrogen cyanide and/or cyanogen chloride.

In one embodiment, a chembio agent may include one or more biological agents. Suitable biological agents may include pathogens. Pathogens are infectious agents that may cause disease or illness to their host (animal or plant). Biological agents may include prions, microorganisms (viruses, bacteria and fungi) and some unicellular and multicellular eukaryotes (for example parasites) and their associated toxins. In some embodiments, pathogens may include one or more of bacteria, protozoa, fungus, parasites, or spore. In some embodiments, pathogens may include virus or prion.

Some examples of bacterial biological agents (and the diseases or effect caused by them) may include one or more of: *escherichia coli* (peritonitis, food poisoning); *mycobacterium tuberculosis* (tuberculosis); *bacillus anthracis* (anthrax); *salmonella* (food poisoning); *staphylococcus aureus* (toxic shock syndrome); *streptococcus pneumoniae* (pneumonia); *streptococcus pyogenes* (strep throat); *helicobacter pylori* (stomach ulcers); or *francisella tularensis* (tularemia).

Some examples of viruses (and the diseases or effect caused by them) may include one or more of hepatitis A, B, C, D and E (liver disease); influenza virus (flu, Avian flu); SARS coronavirus (severe acute respiratory syndrome); herpes simplex virus (herpes); molluscum contagiosum (rash); or human immunodeficiency virus (AIDS).

Some examples of protozoa (and the diseases or effect caused by them) may include one or more of cryptosporidium (cryptosporidiosis); giardia lamblia (giardiasis); plasmodium (malaria); or trypanosoma cruzi (chagas disease). Some examples of fungi (and the diseases or effect caused by them) may include one or more of pneumocystis jiroveci (opportunistic pneumonia); tinea (ringworm); or candida (candidiasis).

Some examples of parasites may include one or more of roundworm, scabies, tapeworm, or flatworm. Some examples of protein-based pathogens may include prions (Bovine spongiform encephalopathy (BSE) commonly known as mad cow disease or variant Creutzfeldt-Jakob disease (vCJD)).

Toxins include proteins capable of causing disease on contact or absorption with body tissues by interacting with biological macromolecules and may be used as bioweapons. Suitable toxins may include Ricin, SEB, Botulism toxin, Saxitoxin, and many Mycotoxins.

Some other examples of diseases caused by biological agents may include anthrax, Ebola, Bubonic Plague, Cholera, Tularemia, Brucellosis, Q fever, Machupo, Coccidioides mycosis, Glanders, Melioidosis, Shigella, Rocky Mountain Spotted Fever, Typhus, Psittacosis, Yellow Fever, Japanese B Encephalitis, Rift Valley Fever, or Smallpox.

In one embodiment, a catalytically active nanoparticle may be capable of reacting or interacting with a contaminant in a fluid stream to form a reaction product having properties different from that of the contaminant in the fluid stream. In one embodiment, the contaminants in the fluid may react or interact with the catalytically active nanoparticle to form a more desirable by-product or end product, and therefore remove the contaminants from the fluid stream. As used herein, the term "fluid" may include any form of readily flowing material, including liquids and gases.

A contaminant may include air pollutants or water pollutants. Air pollutants may include one or more of nitrogen monoxide, nitrogen dioxide, ammonia, carbon monoxide, carbon dioxide, sulfur dioxide, hydrogen cyanide, mercury, dioxin, furan, or volatile organics. Water pollutants may include one or more of volatile organic chlorine compounds such as trichloroethene and tetrachloroethene used in large amounts as degreasing agents and cleaning agents in various industrial fields.

In one embodiment, a catalytically active nanoparticle may be capable of interacting with a contaminant in a gaseous stream, for example, air pollutants. In one embodiment, a catalytically active nanoparticle may be capable of interacting with NO, $NO_2$, or $NH_3$ to form nitrogen and water. In one embodiment, a catalytically active nanoparticle may be capable on interacting with CO to form $CO_2$. In one embodiment, a catalytically active nanoparticle may be capable of interacting with dioxin or furan to form $CO_2$ or HCl. In one embodiment, a catalytically active nanoparticle may be capable of interacting with ozone to form $O_2$.

A membrane may be characterized by one or more of air permeability, moisture vapor transmission rate (MVTR), or chembio agent permeability. In one embodiment, the membrane may have air permeability that is greater than about 0.01 cfm/ft$^2$ at 0.5 inches $H_2O$. In one embodiment, the membrane may have air permeability that is in a range of from about 0.01 cfm/ft$^2$ to about 0.02 cfm/ft$^2$, from about 0.02 cfm/ft$^2$ to about 0.03 cfm/ft$^2$, from about 0.03 cfm/ft$^2$ to about 0.04 cfm/ft$^2$, from about 0.04 cfm/ft$^2$ to about 0.05 cfm/ft$^2$ at 0.5 inches $H_2O$, or from about 0.04 cfm/ft$^2$ to about 0.05 cfm/ft$^2$. In one embodiment, the membrane may have air permeability that is greater than about 1 cfm/ft$^2$ at 0.5 inches $H_2O$. Air permeability as described herein maybe measured using the test conditions described herein in the specification.

In one embodiment, the membrane may have permeability to a chembio agent that is less than about 20 micrograms/24 hours. In one embodiment, the membrane may have a permeability to a chembio agent in a range of from about 1 microgram/24 hours to about 2 micrograms/24 hours, from about 2 microgram/24 hours to about 5 micrograms/24 hours, from about 5 microgram/24 hours to about 10 micrograms/24 hours, from about 10 microgram/24 hours to about 15 micrograms/24 hours, or from about 15 microgram/24 hours to about 20 micrograms/24 hours. In one embodiment, the membrane may have a permeability to a chembio agent that is less than about 1 microgram/24 hours.

In one embodiment, the membrane may have a moisture vapor transmission rate (MVTR) that is greater than about 500 g/m$^2$/day. In one embodiment, the membrane may have a moisture vapor transmission rate in a range of from about 500 g/m$^2$/day to about 600 g/m$^2$/day, from about 600 g/m$^2$/day to about 800 g/m$^2$/day, from about 800 g/m$^2$/day to about 1000 g/m$^2$/day, from about 1000 g/m$^2$/day to about 1500 g/m$^2$/day, or from about 1500 g/m$^2$/day to about 2000 g/m$^2$/day. In one embodiment, the membrane may have a moisture vapor transmission rate (MVTR) that is greater than about 2000 g/m$^2$/day.

In one embodiment, the article may have a moisture vapor transmission rate (MVTR) that is greater than about 4000 g/m$^2$/day. In one embodiment, the article may have a moisture vapor transmission rate in a range of from about 4000 g/m$^2$/day to about 5000 g/m$^2$/day, from about 5000 g/m$^2$/day to about 6000 g/m$^2$/day, from about 6000 g/m$^2$/day to about 7000 g/m$^2$/day, from about 7000 g/m$^2$/day to about 8000 g/m$^2$/day, or from about 8000 g/m$^2$/day to about 10000 g/m$^2$/day. In one embodiment, the article may have a moisture vapor transmission rate (MVTR) that is greater than about 10000 g/m$^2$/day.

In one embodiment, a laminate is provided. A laminate may include the catalytically active membrane described hereinabove and at least one additional layer such as a membrane, film or fabric. In one embodiment, catalytically active membrane 12 may be supported on one or more fabric layer 14 as shown in FIG. 1 to form a laminate 10. In one embodiment, a fabric layer may be sufficiently flexible, pliable and durable for use in articles of apparel or enclosures such as garments, tents, sleeping bags, casualty bags, and the like.

In one embodiment, one or more fabric layer may include a polymer selected from poly(aliphatic amide), poly(aromatic amide), polyester, polyolefin, wool, cellulose based fibers such as cotton, rayon, linen, cellulose acetate and other modified cellulose, polyurethane, acrylics, modacrylics, or a blend comprising any of the above. In one embodiment, one or more fabric layer may include cotton, poly (aliphatic amide), poly (aromatic amide), polyester, polyurethanes, or blends thereof.

In some embodiments, one or more fabric layer may be made of woven fabric. In alternate embodiments, one or more fabric layer may be made of a non-woven fabric. A non-woven fabric may be knit, braided, tufted, or felted.

Figure 2:
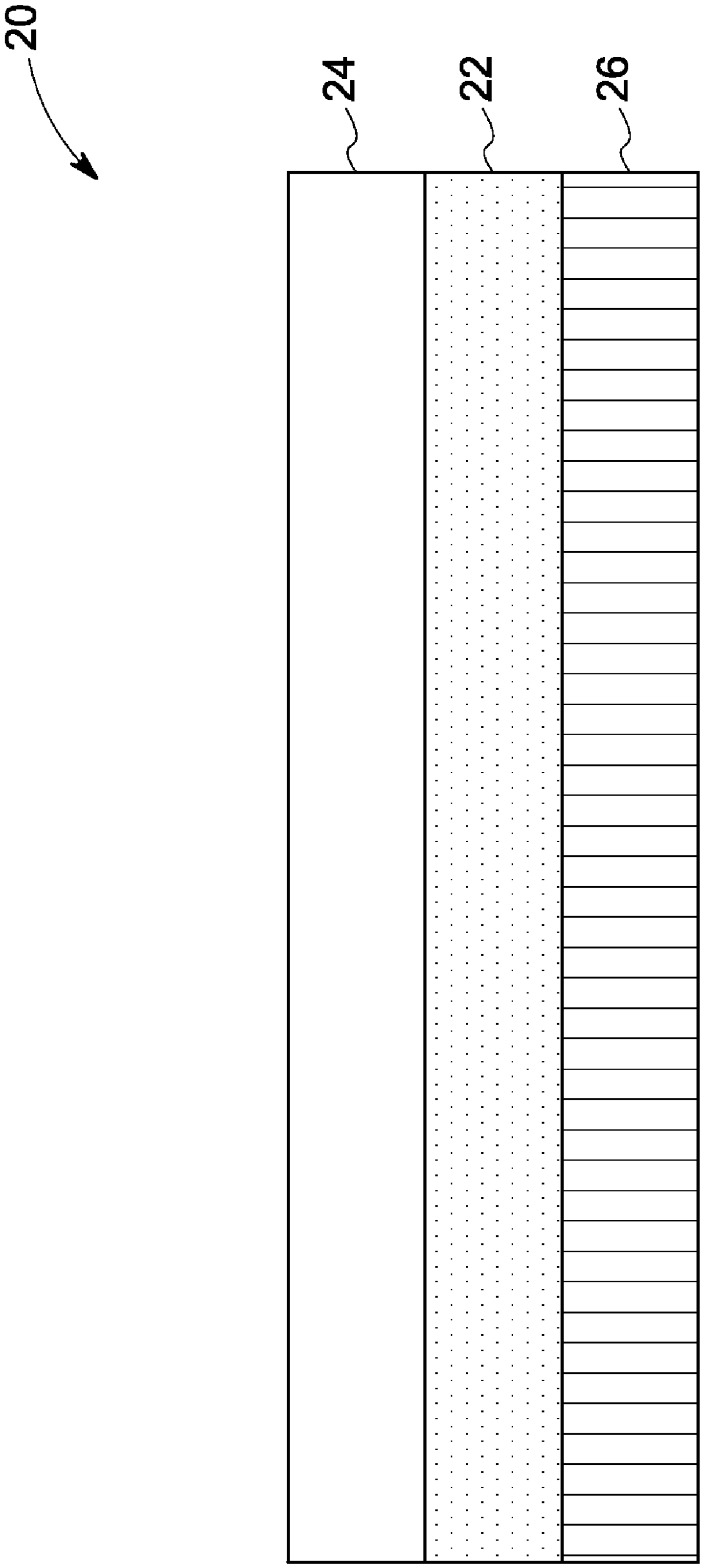
FIG. 2 shows a cross-section of an article in accordance with one embodiment of the invention.
Figure 3:
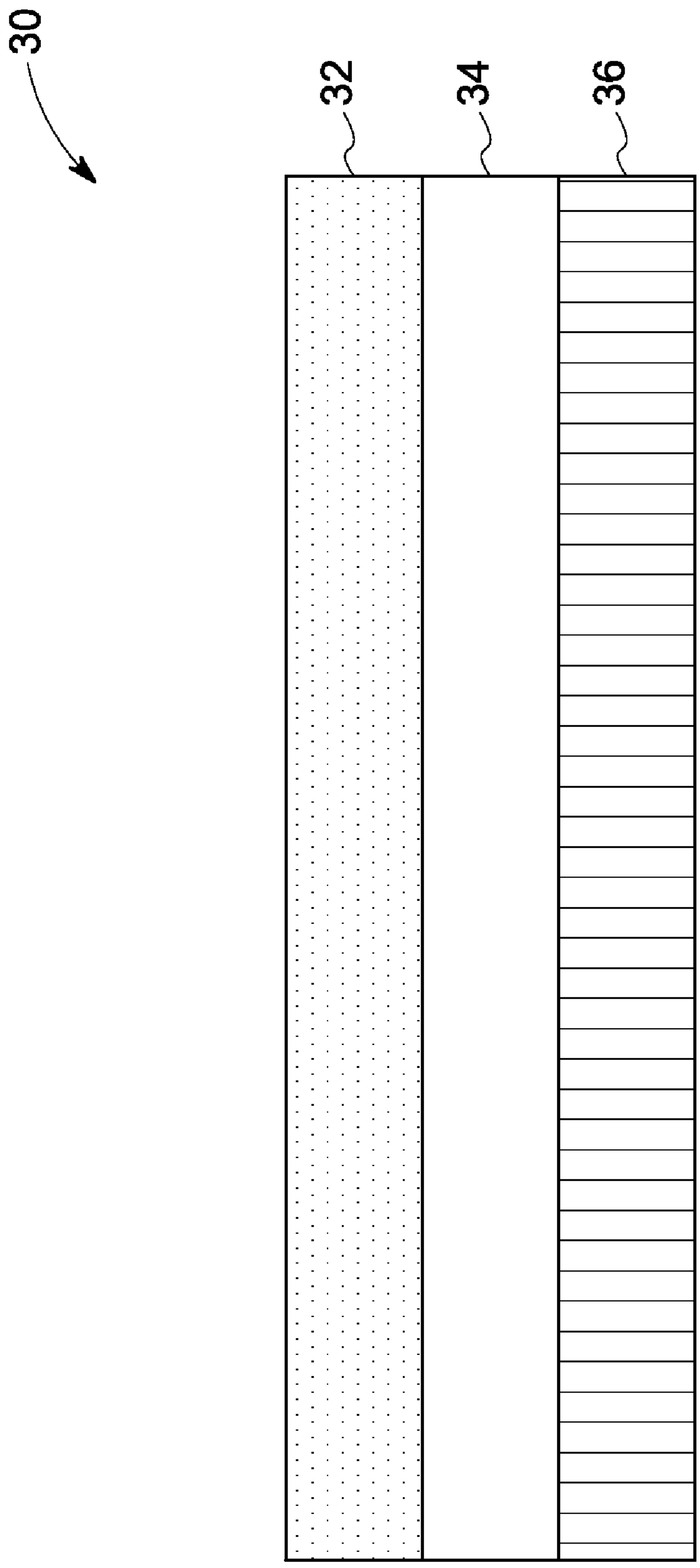
FIG. 3 shows a cross-section of an article in accordance with one embodiment of the invention.

In one embodiment, a laminate may include a catalytically active membrane and at least two fabric materials. The two fabric layers may include the same fabric material or may include different fabric layers. In one embodiment, a laminate 20 may include an outer fabric layer 24 and an inner fabric layer 26 as shown in FIG. 2. The catalytically active membrane 22 may be sandwiched between the outer fabric layer 22 and the inner fabric layer 26. In one embodiment, a catalytically active membrane 32 may be supported on an inner fabric layer 34. The inner fabric layer 34 may be supported on an outer fabric layer 36 to form a laminate 30 as shown in FIG. 3.

An outer fabric layer is the outermost layer of the laminate, which is exposed to the elements. In one embodiment, an outer fabric layer may be woven fabric made of poly(aliphatic amide), poly (aromatic amide), polyester, acrylic, cotton, wool and the like. In one embodiment, the outer fabric layer may be treated to render it hydrophobic or oleophobic. In one embodiment, an inner fabric may be a knit, woven or non-woven fabric, and may be treated to enhance moisture wicking properties or to impart hydrophobic or oleophobic properties.

In some embodiments, the fabric layers may be treated with suitable materials so as to impart properties such as flame resistance, anti static properties, ultra violet radiation resistance, controlled infra red (I. R.) reflectance, camouflage, and the like.

Figure 4:
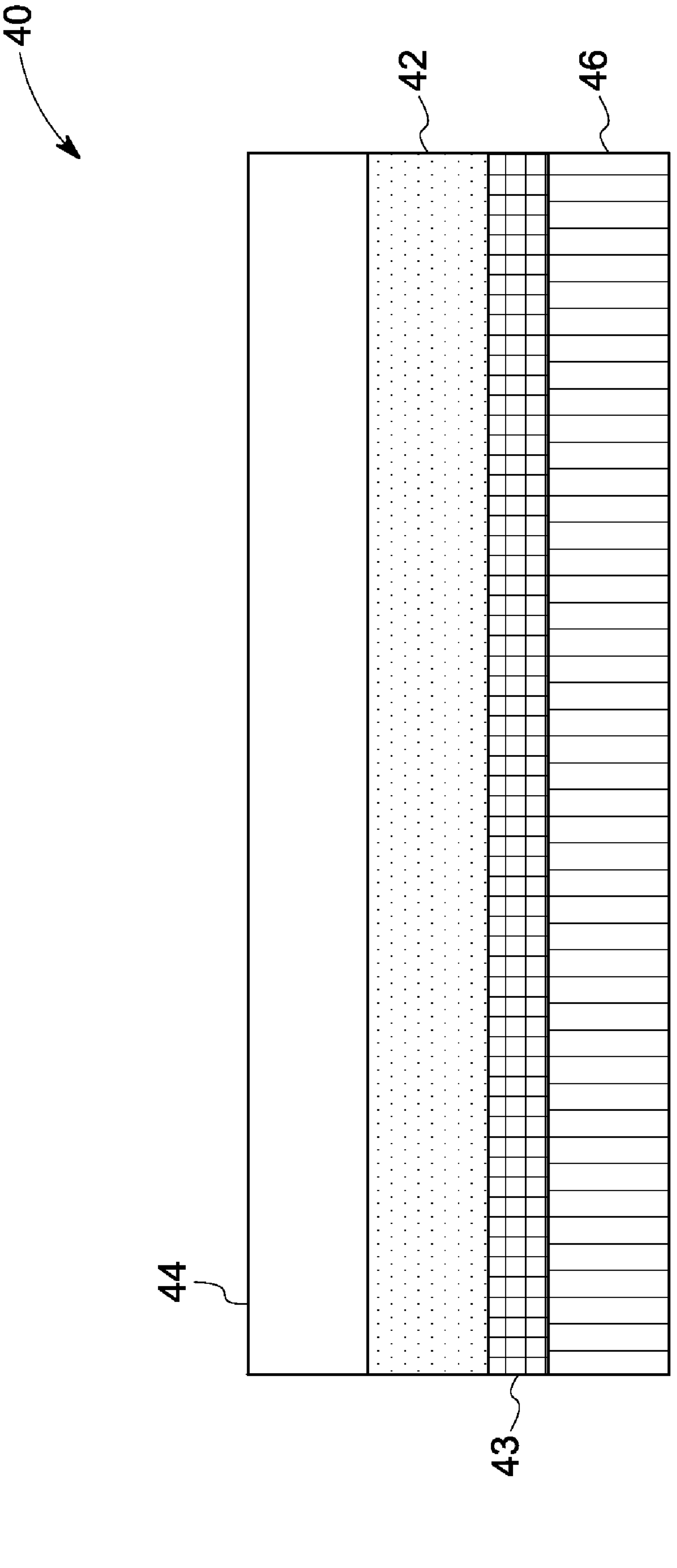
FIG. 4 shows a cross-section of an article in accordance with one embodiment of the invention.
Figure 5:
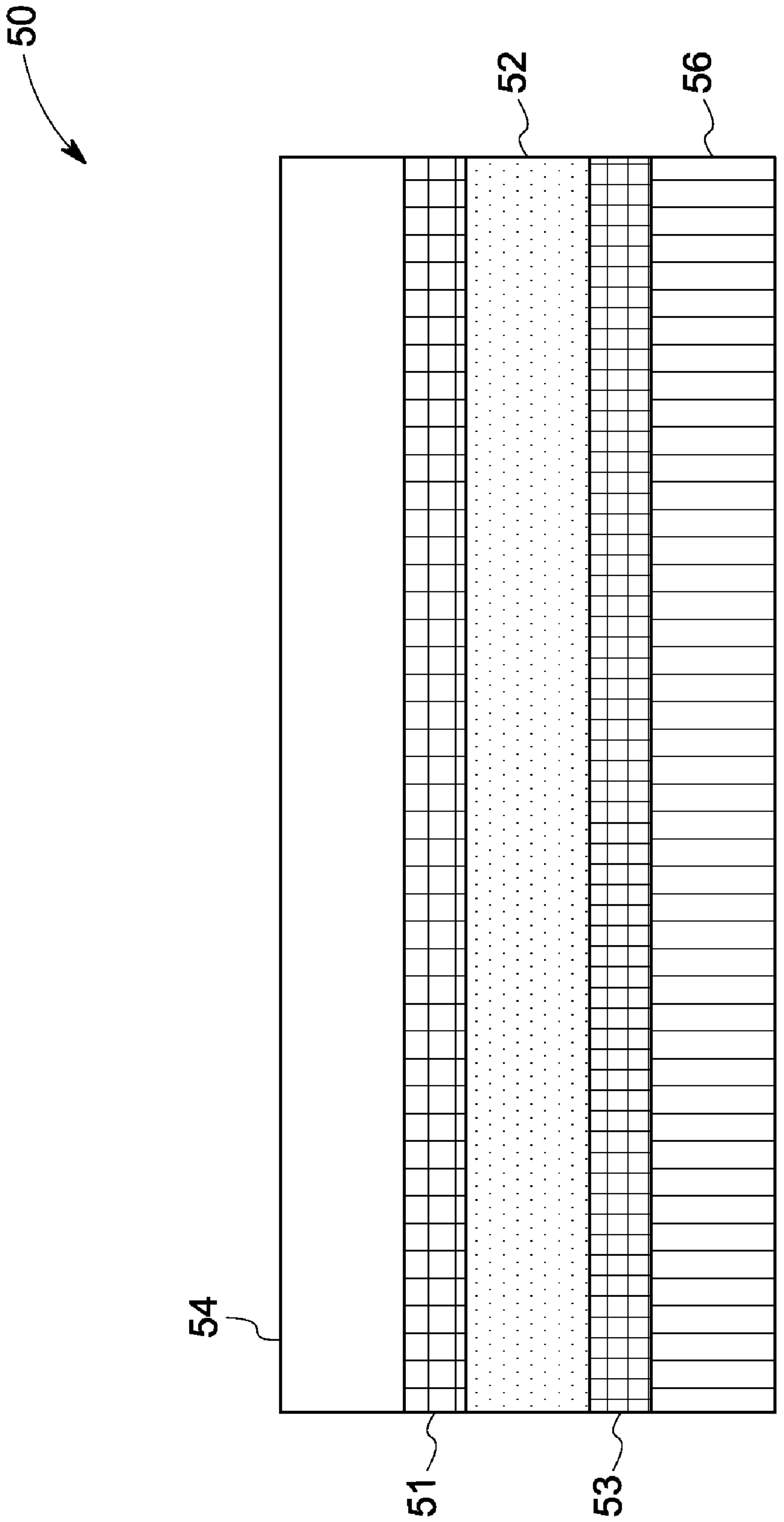
FIG. 5 shows a cross-section of an article in accordance with one embodiment of the invention.

In one embodiment, a laminate may include one or more additional membrane layers. A suitable membrane may include a hydrophilic membrane layer, an oleophobic membrane layer, or a microporous membrane layer. FIG. 4 shows a laminate in accordance with one embodiment of the invention. A catalytically active membrane 42 is sandwiched between an outer fabric layer 44 and an inner fabric layer 46. An additional layer 43 is present between the catalytically active membrane and the inner fabric layer. The additional layer 43 may be a hydrophilic membrane, an oleophobic membrane, or a microporous membrane. In an alternate embodiment, two additional layers 51 and 53 may be present between the catalytically active membrane 52 and the inner 56 and outer 54 fabric layers as shown in FIG. 5.

In one embodiment, the article may be a chembio agent protective apparel. In one embodiment, the membrane may be supported on one or more fabric layers to form the chem bio agent protective apparel, as described hereinabove. In one embodiment, the chembio agent protective apparel may be capable of transmitting moisture vapor, may be air permeable, and may reduce the exposure of a person to harmful chembio agents. In one embodiment, the chembio agent protective apparel may reduce the exposure of a person to harmful chembio agents by reducing the biological activity of the chembio agent or increasing an amount of time for a significant amount of unreacted biologically active chembio agent to pass through the chembio agent protective apparel.

In one embodiment, a chembio agent protective apparel may include garments such as outerwear. Outerwear may include one or more of jackets, tops, shirts, pants, hoods, gloves, coveralls, and the like. In one embodiment, a chembio agent protective apparel may include footwear including, socks, shoes, boots, and the like. In one embodiment, a chembio agent may include innerwear capable of being worn in fluid communication with skin. In one embodiment, a chembio agent protective apparel may include a decontamination suit. In one embodiment, an article as described hereinabove may be employed in protective enclosures such as tents, sleeping bags, casualty bags, shelters and the like.

In one embodiment, the article may be a filter. The term "filter," as used herein, refers to an article that blocks, traps, or modifies contaminants in a fluid stream passing through the article. In one embodiment, the article may be an air filter and the nanoparticle dispersed in the pores of the membrane may be capable of reacting with an air pollutant when the air filter is exposed to a gas stream. In one embodiment, the filter may remove contaminates, such as dust, from the filter stream as well as remove undesirable pollutants by means of catalytically active nanoparticles.

Figure 6:
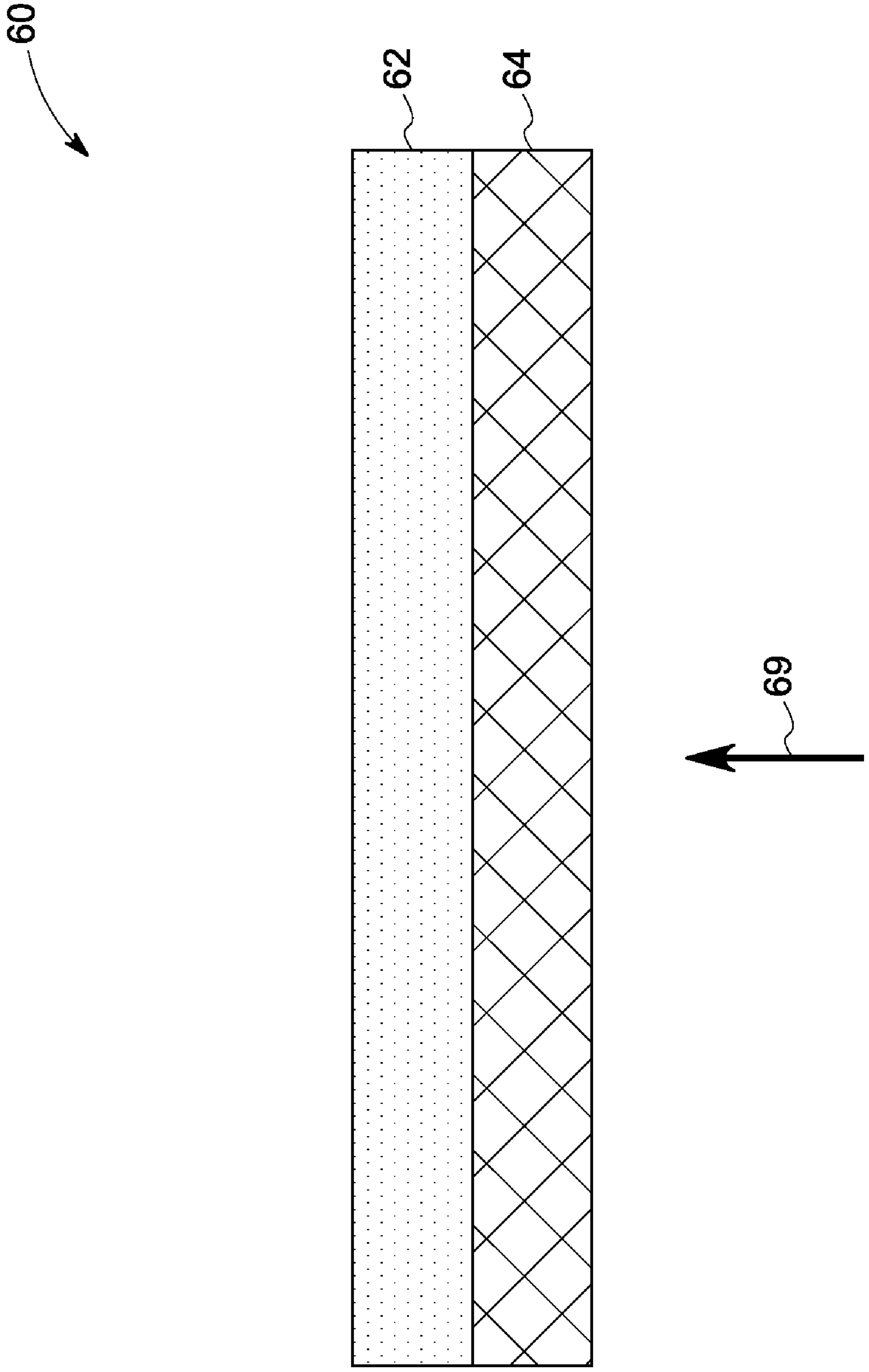
FIG. 6 shows a cross-section of a filter in accordance with one embodiment of the invention.

In some embodiments, a filter may include one or more additional layers. In one embodiment, a filter 60 may include a microporous layer 64 and the catalytically active membrane 62 may be supported on the microporous layer as shown in FIG. 6. In FIG. 6, 69 represents the direction of fluid flow. As used herein, the term "microporous layer" may refer to a layer having a thickness of at least 1 micrometer and having pores with average pore size in arrange of from about 0.05 micrometers to about 10 micrometers.

The protective microporous layer may separate dust particles and other contaminants from the fluid stream. In one embodiment, the microporous layer may be adjacent to the upstream side of the filter, and the microporous layer may prevent dust particles from becoming embedded within the active portion of the filter (for example, membrane with catalytically active nanoparticles). In one embodiment, the microporous layer may not only protect the catalytically active nanoparticles from contamination by dust particles, but may also remove dust particles from the fluid stream exiting the filter.

In one embodiment, a protective microporous layer may include an expanded microporous PTFE membrane. In embodiments in which a microporous expanded PTFE membrane is used on the upstream side of the filter, filter cleaning methods such as shaker, reverse air, and back-pulse, may become especially effective for cleaning the filter because the dust will readily separate from the membrane surface due to its low surface energy. The enhanced cleanability may allow for enhanced filter life.

In some embodiments, depending on the end-use properties desired, a filter may include more than one microporous layer or additional membrane layers (with or without a catalytically active nanoparticle) to provide additional levels of filtration. By varying the number of layers, the location of the layers (e.g., upstream or downstream of the porous membrane) and the compositions of the layers, the filters may be made with varying properties, depending on the requirements of the desired application for the filter. In one embodiment, one or more additional layers in the filter may include a chemical sorbing material, for example, activated carbon.

Figure 7:
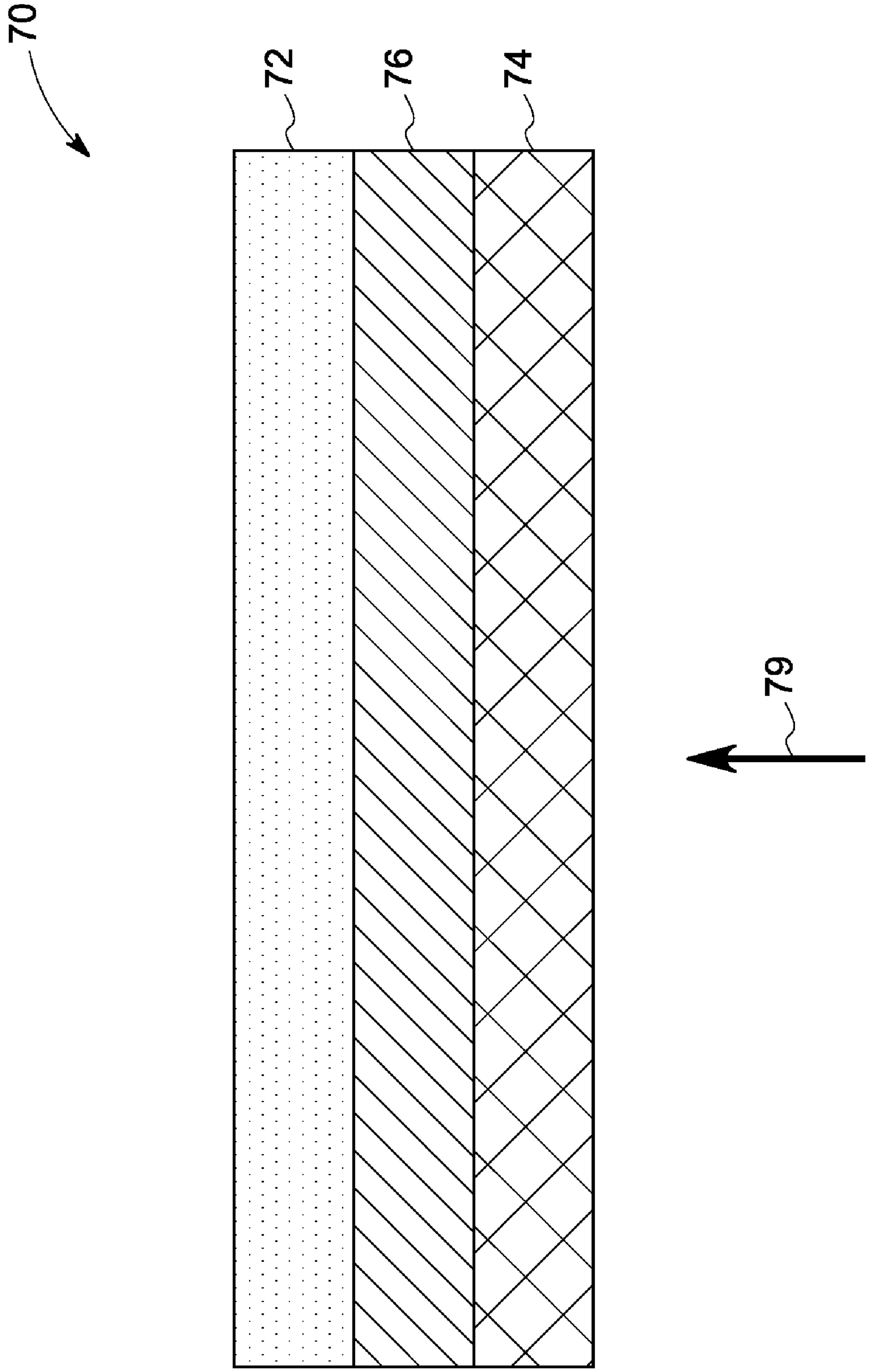
FIG. 7 shows a cross-section of a filter in accordance with one embodiment of the invention.

In some embodiments, a backup or support layer may be laminated into the filter assembly. As is shown in FIG. 7, a filter 70 may have a catalytic active membrane 72, a microporous membrane 74, and a sorptive layer 76. In FIG. 7, 79 represents the direction of fluid flow. The sorptive layer 76 may be mounted either upstream or downstream of the microporous membrane 74 or the catalytically active membrane 72. The sorptive layer 76 may serve to absorb or adsorb other poisons and pollutants in the fluid stream. This layer may be formed from a suitable sorptive material, including carbon filled felt or weaves.

Figure 8:
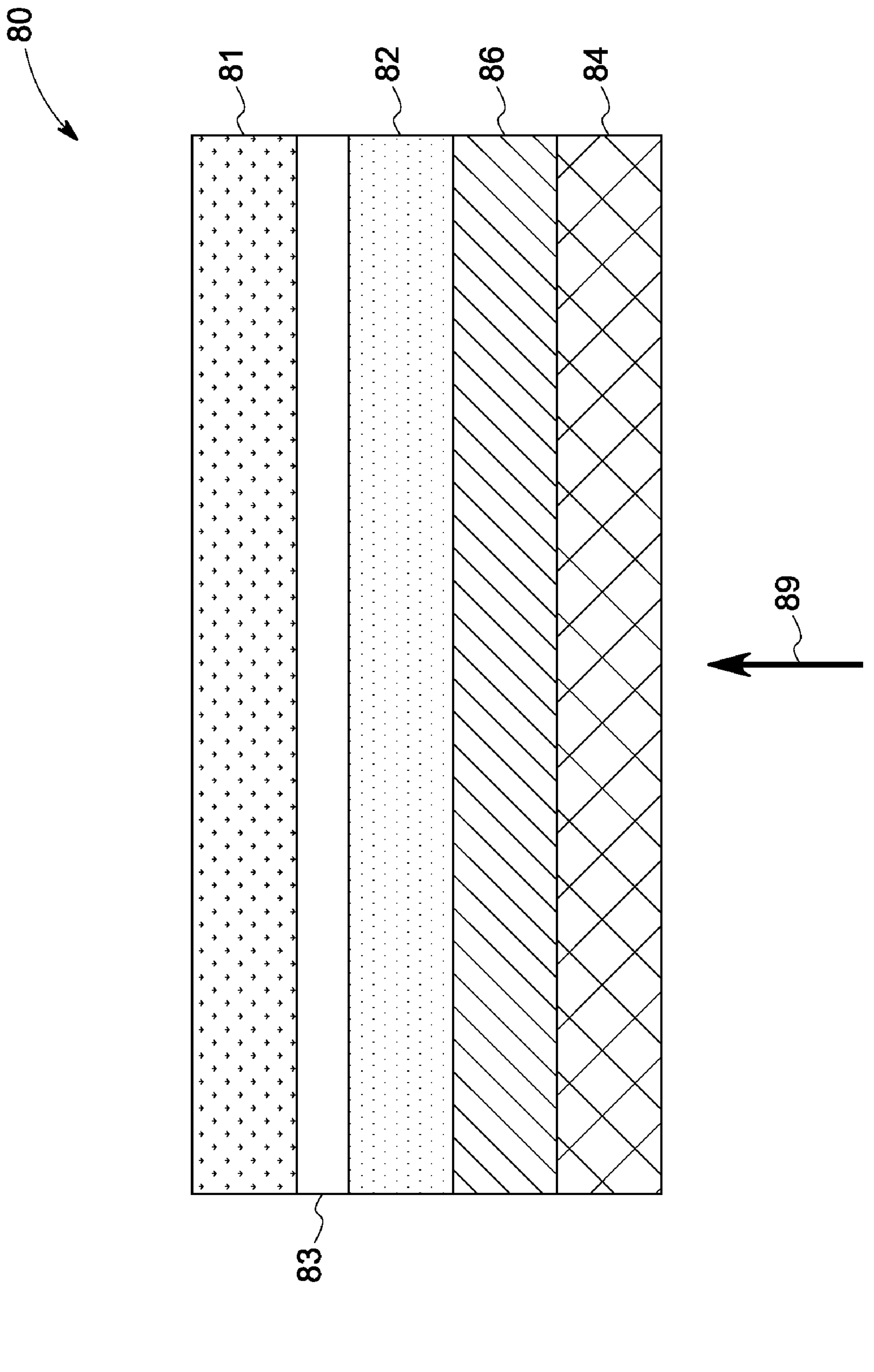
FIG. 8 shows a cross-section of a filter in accordance with one embodiment of the invention.

In some embodiments, the filter may be combined with other catalytically active membranes to achieve additional features. For example, a second catalytically active membrane may be inserted anywhere upstream of the first catalytically active membrane, as is shown in FIG. 8. The filter unit 80 of FIG. 8 employs a first catalytically active membrane 81 and a second catalytic membrane 82. In one embodiment, a layer of material 83 may be included between the two layers 81, 82 to isolate the layers from each other and/or to provide some other function (for example, scrim, absorption, liquid separation, further catalytic function, etc.). A protective microporous membrane 84 and sorptive layer 86 may be provided upstream. In FIG. 8, 89 represents the direction of fluid flow. In some embodiments, the two catalytically active layers 81,82 may use identical or similar catalytic materials. In alternate embodiments, the two catalytically active layers 81,82 may use dissimilar catalytic materials. For example, one catalytically active layer may catalytically reduce $NO_x$, the other may catalytically oxidize CO to $CO_2$. In addition, a second or a third layer may adsorb $SO_3$.

Figure 9:
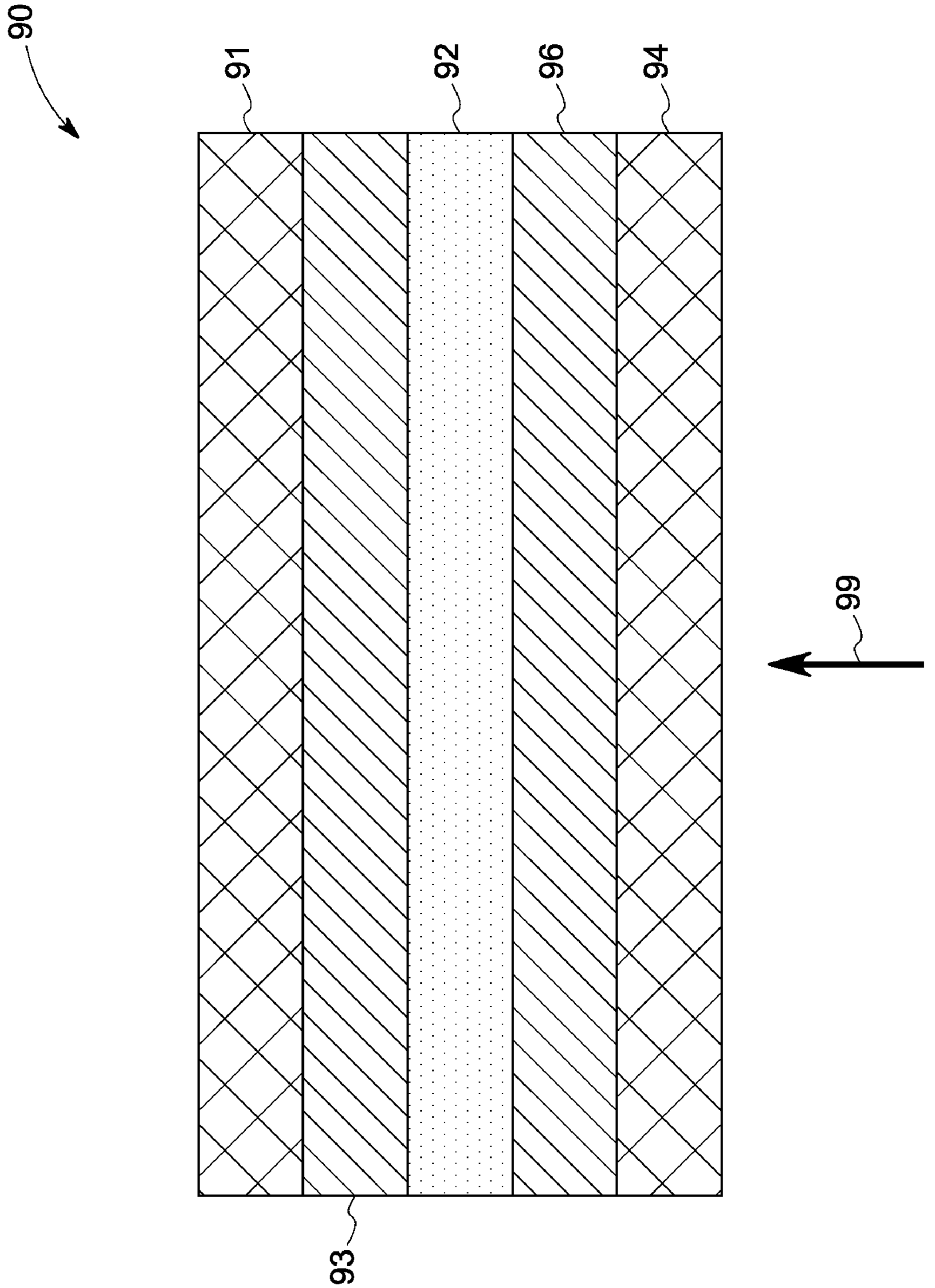
FIG. 9 shows a cross-section of a filter in accordance with one embodiment of the invention.

FIG. 9 illustrates an embodiment where multiple layers of microporous membranes are combined in the filter. In this embodiment, the filter 90 includes a first microporous membrane 94, a sorptive layer 96, a catalytic active membrane 92, a sorptive layer 93, and a second microporous membrane 91. In FIG. 9, 99 represents the direction of fluid flow The sorptive layer 93 may include a material that can absorb or adsorb undesirable materials from the fluid stream before it exits the filter, such as a carbon-filled polymer. In one embodiment, a second microporous membrane 91 may resistance to distortion of the filter when it is place in a strong fluid stream or in direct contact with filter support materials such as filter cages. A second microporous membrane 91 may be constructed from a strong, porous, and abrasion-resistant material, such as a polymer felt or mesh.

In one embodiment, the filler may in the form of a sheet, a rolled sheet or a panel. In one embodiment, the filter may be in the form of a vacuum bag, industrial baghouse, a pleated cartridge, or a flat filter panel.

In one embodiment, a method is provided to form a porous membrane having uniformly dispersed nanoparticles by employing sol-gel techniques. In one embodiment, a method may include impregnating a membrane with a nanoparticle precursor. In some embodiments, a pre-formed commercially available membrane, such as an ePTFE membrane may be impregnated with a nanoparticle precursor.

In one embodiment, a method may include providing a mixture of a nanoparticle precursor and a solvent in a predetermined amount. A nanoparticle precursor-solvent mixture may be in the form of a solution, a suspension, or an emulsion. In embodiments involving application of a reducing agent, a mixture of the nanoparticle precursor/solvent may include a reducing agent in a desired amount. In one embodiment, a nanoparticle precursor may be applied directly to the porous membrane and may be free of a solvent.

A suitable solvent may be aqueous or non-aqueous depending on the solubility of the nanoparticle precursor in the particular solvent. Suitable solvents may include aliphatic hydrocarbons, aromatic hydrocarbons, compounds with hydrogen bond accepting ability, or solvents miscible with water. Suitable aliphatic and aromatic hydrocarbon compounds may include one or more of hexane, cyclohexane, and benzene, which may be substituted with one or more alkyl groups containing from 1-4 carbon atoms. Suitable compounds with hydrogen-bond accepting ability may include one or more of the following functional groups: hydroxyl groups, amino groups, ether groups, carbonyl groups, carboxylic ester groups, carboxylic amide groups, ureido groups, sulfoxide groups, sulfonyl groups, thioether groups, and nitrile groups. Suitable solvents may include one or more alcohols, amines, ethers, ketones, aldehydes, esters, amides, ureas, urethanes, sulfoxides, sulfones, sulfonamides, sulfate esters, thioethers, phosphines, phosphite esters, or phosphate esters. Some other examples of suitable non-aqueous solvents include toluene, hexane, acetone, methyl ethyl ketone, acetophenone, cyclohexanone, 4-hydroxy-4-methyl-2-pentanone, isopropanol, ethylene glycol, propylene glycol, diethylene glycol, benzyl alcohol, furfuryl alcohol, glycerol, cyclohexanol, pyridine, piperidine, morpholine, triethanolamine, triisopropanolamine, dibutylether, 2-methoxyethyl ether, 1,2-diethoxyethane, tetrahydrofuran, p-dioxane, anisole, ethyl acetate, ethylene glycol diacetate, butyl acetate, gamma-butyrolactone, ethyl benzoate, N-methylpyrrolidinone, N,N-dimethylacetamide, 1,1,3,3-tetramethylurea, thiophene, tetrahydrothiophene, dimethylsulfoxide, dimethylsulfone, methanesulfonamide, diethyl sulfate, triethylphosphite, triethylphosphate, 2,2'-thiodiethanol, acetonitrile, or benzonitrile.

A nanoparticle precursor/solvent mixture may be applied to the porous membrane by coating, dipping, brushing, painting, or spraying such that the nanoparticle precursor and solvent (if employed) are able to penetrate the interstices, pores, and the interior volume of the porous membrane. A coating technique may include forwarding roll coating, reverse roll coating, gravure coating, doctor coating, or kiss coating. In one embodiment, the solvent or the excess solution may be removed from the membrane pores or the surface of the membrane by vacuum drying, oven drying, and the like. Additional precursor application steps, and subsequent drying, may be employed depending on the precursor concentration and thickness of the membrane.

In one embodiment, a method may include exposing the membrane and the nanoparticle precursor to a stimulus to form a metal nanoparticle. As described hereinabove, a stimulus may include exposure to one or more of exposure to thermal energy, electromagnetic radiation, or water. In one embodiment, a stimulus may include application of thermal energy and the membrane may be heated to a temperature in a range of from about 40 degrees Celsius to about 120 degrees Celsius to form the nanoparticle.

In one embodiment, a method may include hydrolyzing the nanoparticle precursor to form a metal nanoparticle. In one embodiment, the nanoparticle precursor may be hydrolyzed using the moisture in the air. In one embodiment, a nanoparticle precursor in the membrane may be hydrolyzed by allowing the precursor in the membrane to react with the moisture in the air for a certain period of time.

In one embodiment, the nanoparticle precursor may be exposed to the stimulus for a time period that is less than about 1 hour. In one embodiment, the nanoparticle precursor may be exposed to the stimulus for a time period in a range of from about 1 hour to about 2 hours, from about 2 hours to about 5 hours, from about 5 hours to about 10 hours, from about 10 hours to about 20 hours, or from about 20 hours to about 24 hours. In one embodiment, the nanoparticle precursor may be exposed to the stimulus for a time period that is greater than about 1 day.

In one embodiment, a method may include dispersing catalytically active nanoparticles throughout the pores of the membrane. Nanoparticles may be dispersed throughout the pores by in-situ generation of the catalytically active particles inside the pores of the membrane. In one embodiment, a method may include dispersing the catalytically active nanoparticles inside the pores of the membranes by sol-gel synthesis using a nanoparticle precursor.

In one embodiment, a method may include fabrication of a laminate that may be used in a chembio agent protective apparel or in an air-filter. In one embodiment a catalytically active membrane may be laminated to one or more layer of a membrane, a film, or an apparel fabric. In one embodiment, lamination may be achieved by thermal bonding, hot roll lamination, ultrasonic lamination, adhesive lamination, forced hot air lamination, or by mechanical attachment such as stitches.

In one embodiment, a laminate may be fabricated using a seaming technique. A seaming technique may involve stitching or heat sealing the edges to be joined and then heat sealing the seam to the inside of the laminate. In one embodiment, the laminate may be fabricated using adhesives or stitching. Stitching if employed may be present throughout the layers such as in quilting, or point bonded non-woven materials, or may only be present at the seams or at the cuffs, for example in garments, gloves and other articles of clothing.

In one embodiment, a method for reducing exposure of a person to biologically active chembio agents is provided. The method may include exposing a chembio agent to a membrane having pores and a plurality of catalytically active nanoparticles dispersed throughout the pores. The method may include infiltrating the chembio agent into the pores and reacting the chembio agent with the nanoparticles within the pores. In one embodiment, a method may include photo catalytically reacting the chembio agent with the catalytically active nanoparticles by exposure to radiation having a wavelength of 400 nanometers or less In one embodiment, the method may include one or both of reducing the biological activity of the chembio agent or increasing an amount of time for a significant amount of unreacted biologically active chembio agent to pass through the article. In one embodiment, a method may include reducing the biological activity of the chembio agent by at least 80 percent. In one embodiment, a method may include increasing an amount of time for a significant amount of unreacted biologically active chembio agent to pass through the article by at least an hour.

In one embodiment, a method may include interposing between a person and a chembio agent, a chembio agent protective apparel including a membrane that has preferential permeability towards water vapor relative to the chembio agent.

In one embodiment, a method for removing one or more contaminant(s) from fluids is provided. A method may include exposing a fluid stream having a contaminant to a membrane having pores and a plurality of catalytically active nanoparticles dispersed throughout the pores. A method may include infiltrating the fluid stream into the pores and reacting the contaminant with the nanoparticles within the pores. In one embodiment, a method may include reacting or interacting a contaminant in a fluid stream with the catalytically active nanoparticle to form a reaction product having properties different from that of the contaminant in the fluid stream. In one embodiment, a method may include photo catalytically reacting the contaminants with the catalytically active nanoparticles by exposure to radiation having a wavelength of 400 nanometers or less.

EXAMPLES

The following examples are intended only to illustrate methods and embodiments in accordance with the invention, and as such should not be construed as imposing limitations upon the clauses.

Test Methods

Figure 10:
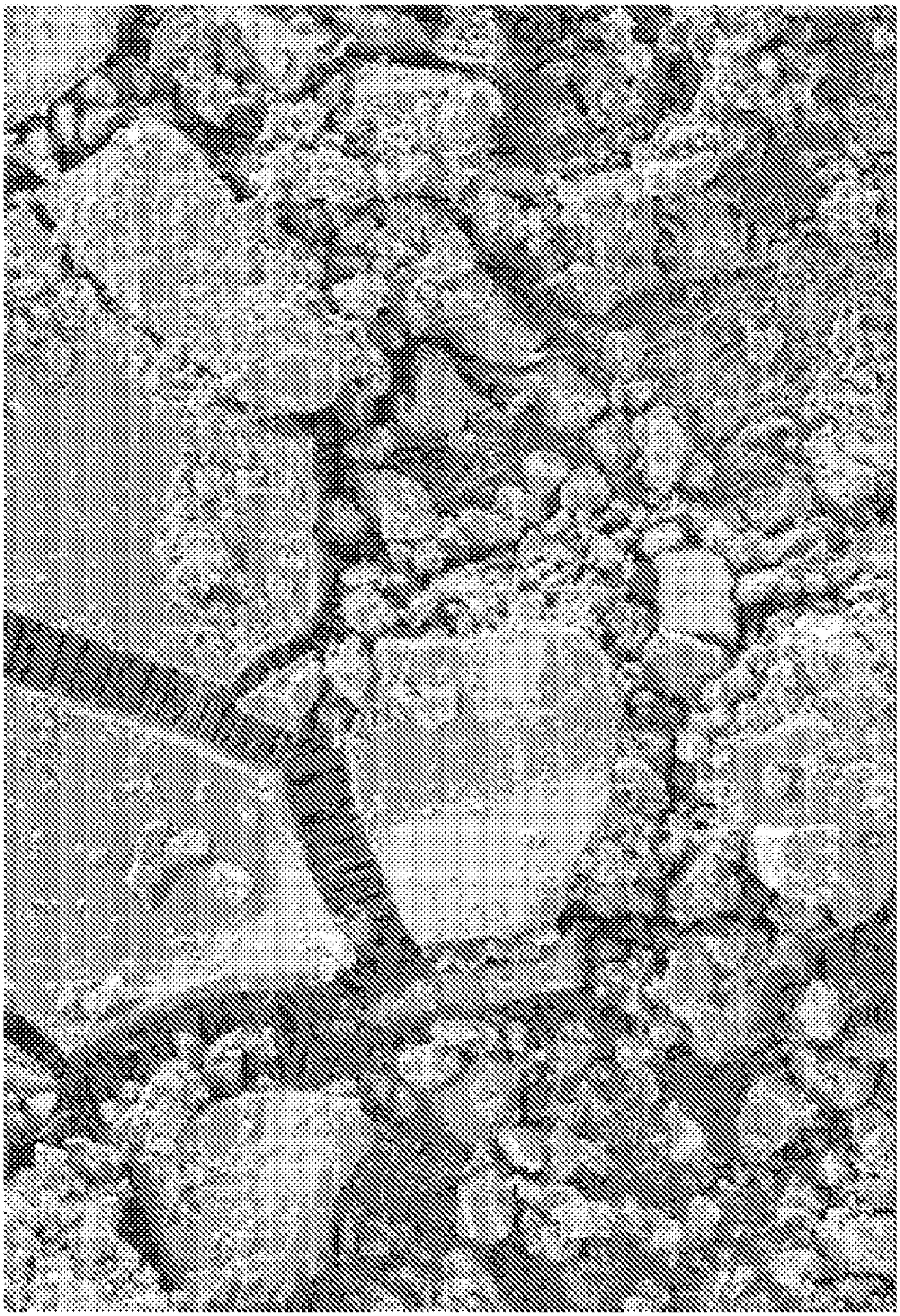
FIG. 10 shows a scanning electron micrograph of a catalytically active nanoparticle loaded membrane.

Moisture Vapor Transmission Rate (MVTR) is measured using the ASTM E99 method unless otherwise indicated. Air permeability is measured using the ASTM 737 method unless otherwise indicated. Chembio agent permeability is measured by US Army Test operating Protocol (TOP 8-2-501 method) or by the ASTM F739 method unless otherwise indicated. Unit average weight of the membrane is determined by the ASTM D3776 method unless otherwise indicated. EXAMPLE 1 Fabrication of catalytically active e-PTFE membrane An e-PTFE membrane (Obtained from GE Energy, Kansas City) with mean pore size of around 0.5 micrometers is dipped in a bath containing neat titanium tetraisopropoxide. The titanium isopropoxide is allowed to react with the moisture in the air at room temperature for 24 hours. FIG. 10 shows a scanning electron microscopy micrograph of the resulting membrane showing hydrolyzed $TiO_2$ nanoparticles dispersed in the porous network.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

The foregoing examples are illustrative of some features of the invention. The appended claims are intended to claim the invention as broadly as has been conceived and the examples herein presented are illustrative of selected embodiments from a manifold of all possible embodiments. Accordingly, it is Applicants' intention that the appended claims not limit to the illustrated features of the invention by the choice of examples utilized. As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations. Advances in science and technology may make equivalents and substitutions possible that are not now contemplated by reason of the imprecision of language; these variations should be covered by the appended claims.

The invention claimed is:

1. An article, comprising:

a membrane having pores and that is air permeable, wherein the membrane comprises a fluorinated polyolefin; and a precursor dispersed throughout the pores, wherein the precursor comprises a metal alkoxide or a metal carbamate, wherein the precursor is essentially free of solvent, and the precursor is responsive to a stimulus to form a catalytically active nanoparticle; wherein the article is a chembio agent protective apparel.

2. The article as defined in claim 1, wherein the fluorinated polyolefin comprises one or both of polyvinylidene fluoride or polytetrafluoroethylene.

3. The article as defined in claim 1, wherein the fluorinated polyolefin comprises expanded polytetrafluoroethylene.

4. The article as defined in claim 1, wherein the membrane comprises one or more of polyolefin, polyamide, polyester, polysulfone, polyether, polyacrylate, polystyrene, polyurethane, polyphenylene sulfone, polyphenylene oxide, or cellulosic polymer.

5. The article as defined in claim 1, wherein the pores have an average pore diameter in a range of from about 10 nanometers to about 10 micrometers.

6. The article as defined in claim 1, wherein the stimulus comprises exposure to heat.

7. The article as defined in claim 1, wherein the stimulus comprises exposure to water.

8. The article as defined in claim 1, wherein the nanoparticle comprises titanium oxide.

9. The article as defined in claim 1, wherein the nanoparticle comprises silver.

10. The article as defined in claim 1, wherein the nanoparticle comprises an oxide of aluminum, silver, copper, or magnesium.

11. The article as defined in claim 1, wherein the nanoparticle comprises a plurality of particles having an average particle size in a range of from about 5 nanometers to about 500 nanometers.

12. The article as defined in claim 1, wherein the nanoparticle comprises a plurality of particles having a shape of a sphere, a cube, a crystal, a rod, a tube, a flake, a fiber, a plate, or a whisker, or the plurality includes a combination of two or more of the foregoing shapes.

13. The article as defined in claim 1, wherein the nanoparticle is present in an amount in a range of from about 0.1 weight percent to about 20 weight percent of the combined weight of the membrane and the nanoparticle.

14. The article as defined in claim 1, wherein the nanoparticle is capable of inactivating a chembio agent when the article is contacted to a chembio agent.

15. The article as defined in claim 14, wherein the chembio agent is a chemical agent comprising one or both of an incapacitating agent or a lachrymatory agent.

16. The article as defined in claim 14, wherein the chembio agent is a chemical agent comprising a vesicant.

17. The article as defined in claim 14, wherein the chembio agent is a chemical agent comprising one or both of a pulmonary agent or a blood agent.

18. The article as defined in claim 14, wherein the chembio agent is a chemical agent comprising a nerve agent.

19. The article as defined in claim 18, wherein the nerve agent comprises one or more of tabun, sarin, soman, cyclosarin, or GV.

20. The article as defined in claim 14, wherein the chembio agent is a chemical agent comprising a toxin.

21. The article as defined in claim 14, wherein the chembio agent is a biological agent comprising a pathogen.

22. The article as defined in claim 21, wherein the pathogen is bacteria, protozoa, fungus, spore, or parasite.

23. The article as defined in claim 21, wherein the pathogen is virus or prion.

24. The article as defined in claim 1, wherein the membrane has an average thickness in a range of from about 0.0005 inches to about 0.005 inches.

25. The article as defined in claim 1, wherein the membrane has a unit average weight in a range of from about 0.05 $oz/yd^2$ to about 3.0 $oz/yd^2$.

26. The article as defined in claim 1, wherein the membrane has air permeability that is greater than about 0.01 $cfm/ft^2$ at 0.5 inches $H_2O$.

27. The article as defined in claim 1, wherein the membrane has permeability to a chembio agent that is less than about 20 micrograms/24 hours.

28. The article as defined in claim 1, wherein the membrane is supported on one or more fabric layer.

29. The article as defined in claim 28, wherein the fabric is knit, woven, braided, tufted, or felted.

30. The article as defined in claim 1, wherein the apparel comprises outerwear, glove, or footwear.

31. The article as defined in claim 1, wherein the apparel comprises innerwear capable of being worn in fluid communication with skin.

32. The article as defined in claim 1, wherein the apparel comprises one or more of a jacket, a pant, a glove, or a hood.

33. The article as defined in claim 1, wherein the article is a decontamination suit.

34. An article, comprising:

a membrane having pores and that is air permeable, wherein the membrane comprises a fluorinated polyolefin;

a precursor dispersed throughout the pores, wherein the precursor comprises a metal alkoxide or a metal carbamate, wherein the precursor is essentially free of solvent; and a plurality of nanoparticles dispersed throughout the pores, and the nanoparticles are catalytically active; wherein the nanoparticles comprise a decomposition product of the precursor;

wherein the article is a chembio agent protective apparel.

* * * * *